Figure 5:
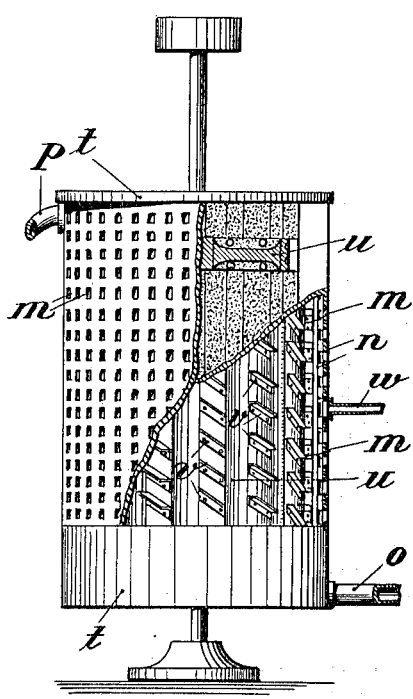

J. G. F. DOMBACH.
PROCESS FOR THE TREATMENT OF GRAIN.
APPLICATION FILED JAN. 15, 1909.
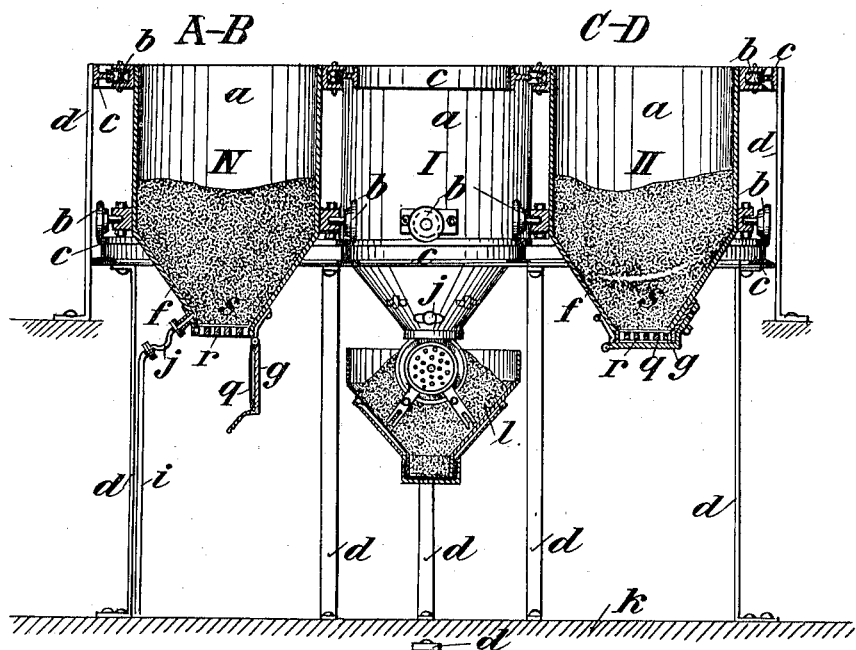
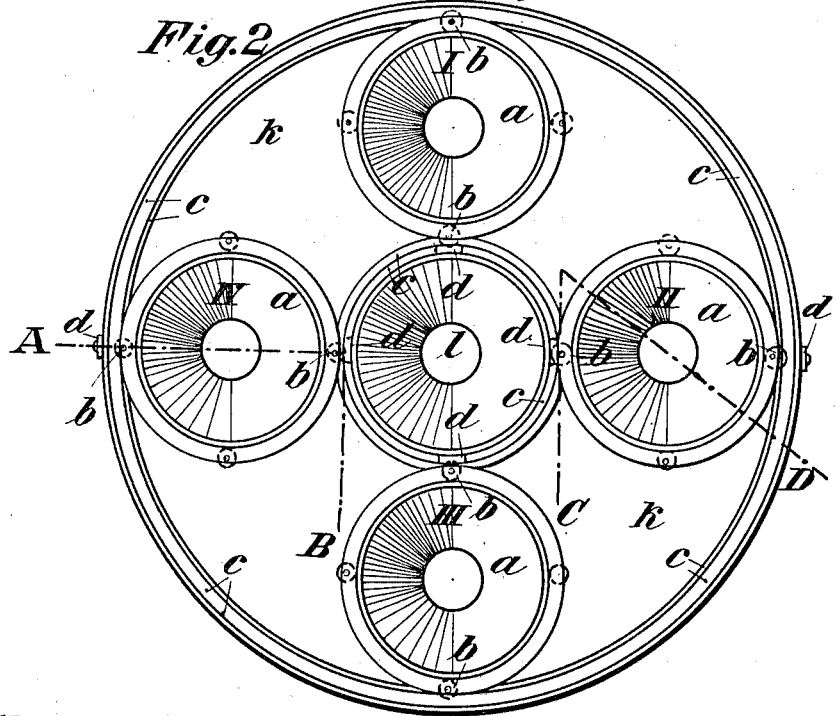

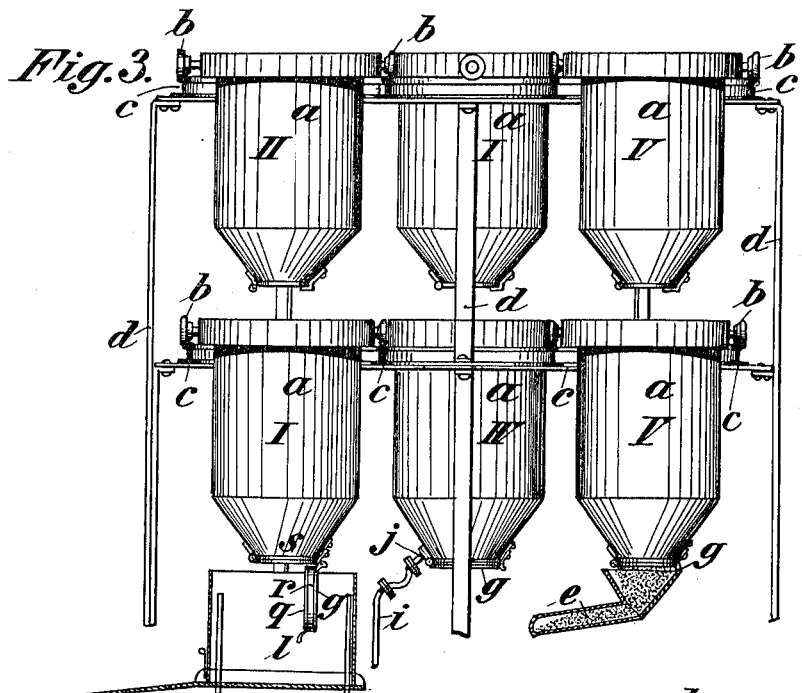
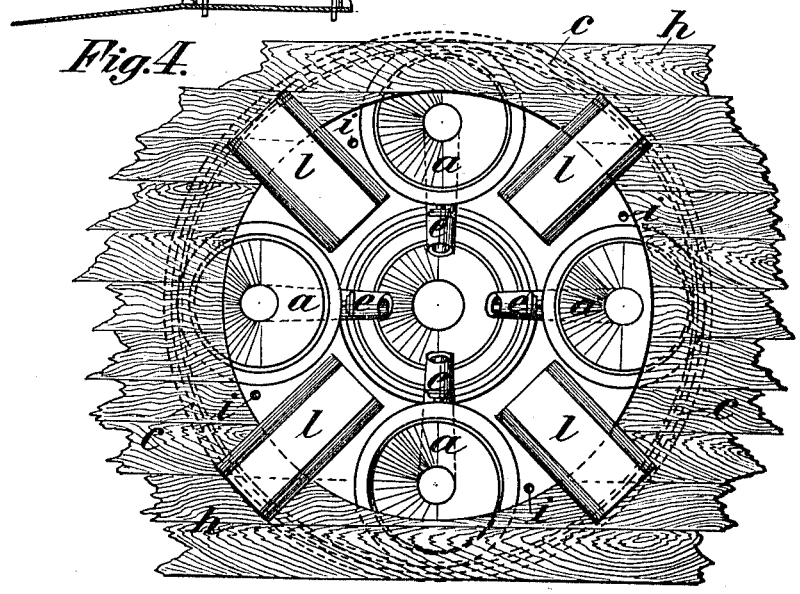

J. G. F. DOMBACH.
PROCESS FOR THE TREATMENT OF GRAIN.
APPLICATION FILED JAN. 15, 1909.

1,040,290.

Patented Oct. 8, 1912.

3 SHEETS—SHEET 3.

Witnesses:

Inventor:
Johann Georg Ferdinand Dombach
by
Meyers, Cushman & Rea
Attorneys

UNITED STATES PATENT OFFICE.

JOHANN GEORG FERDINAND DOMBACH, OF AMSTERDAM, NETHERLANDS.

PROCESS FOR THE TREATMENT OF GRAIN.

1,040,290.   Specification of Letters Patent.   Patented Oct. 8, 1912.

Application filed January 15, 1909. Serial No. 472,503.

*To all whom it may concern:*

Be it known that I, JOHANN GEORG FERDINAND DOMBACH, a citizen of the Netherlands, subject of the Queen of the Netherlands, residing at Amsterdam, in the Kingdom of the Netherlands, have invented certain new and useful Improvements in Processes for the Treatment of Grain, of which the following is a full, clear, and exact description.

In the milling industry it is considered a great disadvantage that all the properties of the various kinds of grain treated, that is to say, wheat, rye, barley, oats and the like, can be determined only after the completion of the entire milling and baking process. Analysis may determine the constituents of a grain of wheat but cannot determine the color of flour which it will produce nor its baking qualities, which is unfortunate as the color of flour forms an important property in a certain class of baking products.

It has been assumed theoretically that a high percentage of gluten in grain gives superior baking qualities; practical experience however, has shown that from grain containing little gluten a flour of good quality may be made. The cause of this difference between theory and practice it is believed is that the chemical constitution of the gluten and other parts of the grain determine its quality, rather than the amount of gluten. Attention, therefore, has been directed to the discovery of the process by means of which it is rendered possible to influence the character of the constituent parts of grain so as to determine in advance its suitability for baking.

The invention relates to a process and apparatus for invariably producing flour of uniform quality, while it moreover enables inferior grain that has been injuriously affected by natural causes such as the quality of the ground or want of sun to have imparted to it an equally high suitability for baking with grain of superior quality, without necessitating the addition of expensive, specially selected kinds of grain, which are naturally very suitable for baking.

The process to which this invention relates enables flour of good quality to be obtained even when all the grain used is of inferior quality. This is effected either by subjecting a portion of the grain to be treated to a swelling or germination process or by adding to the grain to be converted into flour a certain quantity of grain which has been subjected to a swelling or germination process.

In carrying out the process to which this invention relates it is immaterial whether the grain which has been caused to swell or germinate and the grain to be ground which has not been thus treated are of the same or of different quality. The quantity of swollen or germinated grain to be added to the grain to be ground depends on the degree of suitability for baking which it is desired to attain.

The process is most advantageously arrived at by dividing it into two separate but connected operations in such manner that, for instance, a small portion only of the grain to be ground is subjected to the swelling or germination process, while the greater portion is not subjected thereto.

A. The grain which is not subjected to the swelling or germination process first undergoes a preliminary cleansing and is thereupon repeatedly washed, while finally it is dried in a well ventilated chamber. In all the methods of treating grain heretofore usually employed, the principal feature of the cleansing of the grain has consisted in the peeling and degerminating thereof, which is usually effected by means of special machinery. In the treatment of grain in accordance with the present invention, however, the grain is neither peeled nor degerminated as the inventor has learned by experience that the separate grains are often injured thereby.

B. The grain which is to be subjected to the swelling or germination process, having been suitably cleansed, preferably in the manner already described, is first repeatedly washed and is then subjected to the swelling or germination process. After swelling or germination has been effected, the grain is dried and cooled in the manner above referred to. The swelling or germinating process is so arranged as to insure that the swelling or germination shall be only of a partial character, the complete swelling or germination of the grain being avoided.

The swelling or germinating process adopted for the purpose of the present invention differs from the usual swelling or germinating process. In the first instance the quantities to be treated are often vary large; and, secondly, it is necessary, especially when the grain in question is wheat, that the swelling or germinating process should be rapidly carried out, as wheat easily and rapidly passes over into fermentation. For the purpose of accelerating the treatment, the softening and the swelling or germinating processes are preferably carried out in such manner as to render unnecessary the transferring of the grain, that is to say, both processes take place in the same vessel or apparatus. The time required for softening the grain is usually from 6 to 10 hours. When the grain has been sufficiently softened the liquid in which the softening has been effected is drawn off and the grain is subjected to the swelling or germinating process in the same receptacle for a suitable period, say about 12 hours. While the swelling or germinating process is in progress air under pressure is forced through the whole mass of the grain to be swollen or germinated by which means the process is advantageously influenced and accelerated. When the process has been completed the grain which has been treated in the manner just described is mixed with grain which has not been caused to swell or germinate, whereupon the whole mass is brushed and polished and then ground. The softening, swelling or germinating, as well as the washing of the grain, is effected in apparatus specially constructed for this purpose.

The accompanying drawings show apparatus in accordance with this invention, wherein—

Figure 7:
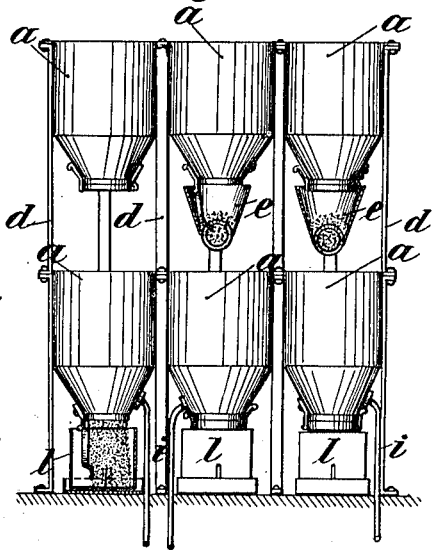
Figure 6:
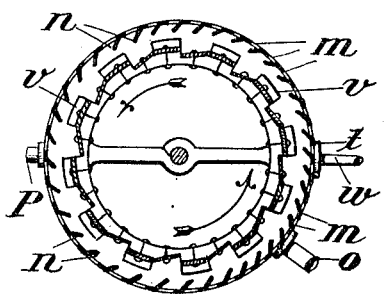
Figure 8:
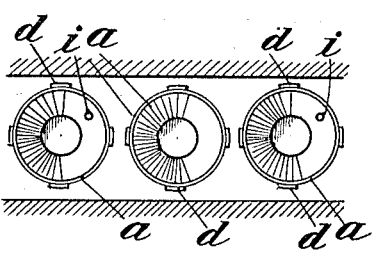

Figure 1 illustrates a movable apparatus for effecting the softening and the swelling or germinating, in which the softening and the swelling or germinating is effected in the same receptacle, the apparatus being of the shape commonly known as cylindro-conical, with circular roller track, and movably arranged on rails, as shown partially in front view and partially in vertical section. Fig. 2 shows the same apparatus in plan. Fig. 3 shows an apparatus having separate receptacles for effecting the softening and for effecting the swelling or germinating, the arrangement being such that the receptacle for softening may be stationary and the other movably arranged. Fig. 4 is a plan of Fig. 3. Fig. 5 shows an apparatus for effecting the repeated washing of the grain, the casing being partially removed. Fig. 6 is a horizontal section through Fig. 5. Fig. 7 shows a constructional form of apparatus provided with separate, stationary receptacles for effecting the softening and the swelling or germinating of the grain; and Fig. 8 is a view of Fig. 7 from above.

In the drawings $a$ indicates the softening or the swelling or germinating receptacles, which are either fixed to the frame formed by the supports $d$ or are arranged on the rails $c$ so as to be capable of rotation upon the wheels or rollers $b$ (see Figs. 3 and 4). It is assumed that the apparatus is continuously operated, in such manner that a number of receptacles suitably arranged, that is to say, in a circle, in series or in stages, above or behind one another, are continuously in operation in such manner that when, after the completion of the softening, swelling or germinating process the contents of the first apparatus are removed to the drying chamber, the contents of the second apparatus have already been sufficiently swollen or germinated to enable them to be transferred to the drying chamber immediately upon the termination of the period required for drying the contents of the first apparatus. The contents of the third apparatus are meanwhile being swollen and germinated while the contents of the fourth are being softened, and so forth. Any apparatus the contents of which have been conveyed into the drying chamber is at once refilled. It is consequently advantageous that the emptying of the receptacle after the swelling or germinating has been completed should be effected not immediately but in a regular manner corresponding to the further manipulation of the grain. This is effected by means of a rocking funnel by means of which the amount of swollen or germinated grain to be removed to the drying chamber can be regulated as desired. The moving forward of the receptacle toward the outlet leading to the drying chamber can be effected in any suitable manner, it may be automatically moved at certain stated intervals. It is advantageous so to arrange the receptacles that they run on rails or on a rotating disk.

As already stated, the receptacles shown in Figs. 1 and 2 serve for effecting both the softening and the swelling or germinating of the grain; and to this end they are provided at the bottom with valves of special construction. It is obvious that while the receptacle must be closed watertight while the softening process is carried out, provision must be made for the softening liquid to escape without carrying away the grain after the process has been completed. While the swelling or germinating process is in progress, the receptacle must again be completely closed by the valve, as otherwise the air under pressure could not be forced to pass through the grain so as to escape at its surface after having passed through it. After the swelling or germinating process has been completed, it is necessary to open the valve completely to permit the swollen or germinated moist grain to pass into the rocking hopper. For this purpose the valve is made in two parts, consisting of a lower unperforated valve $g$, the upper face of which is covered with a sheet $q$ of indiarubber or any other suitable packing material and an upper valve consisting of a valve seat r perforated with large apertures, and covered on its upper face by a sieve like material s such, for instance, as gauze. This arrangement enables the softening liquid to flow off through the large apertures in the valve seat without carrying away any of the grains. If the apertures in the upper valve were only of small diameter, it would soon happen that the grain would stop the apertures and so interfere with the proper operation of the apparatus. It therefore follows that during the softening period both valves must be closed, that the lower valve must then be opened to enable the softening liquid to escape, that both valves must again be closed during the time the swelling or germinating process is in progress and that both the upper valve and the lower valve, which is connected with it, must be opened after the swelling and germinating process is completed.

In Figs. 1 and 2, II indicates a receptacle both valves of which are closed during the period of softening the grain; IV, a receptacle at the beginning of the swelling or germinating period, with the pipe j conveying air under pressure attached to the receptacle and coupled to the stationary air supply pipe i and with the lower valve still open. I indicates a receptacle in the course of being emptied, and shows both valves open as well as the rocking hopper l, into which the moist grain runs. The accumulation of the grain in the hopper is indicated by stippling.

In the constructional form illustrated in Figs. 3 and 4 the softening, and the swelling or germinating of the grain are not effected in the same receptacle. It is advantageous in this case to arrange the receptacles in which the softening takes place above those intended for the swelling or germinating. The receptacles for the softening process are preferably stationary and need be provided only with an ordinary valve. The lower receptacles on the contrary are furnished with double valve already described. After the grain has been softened for a sufficiently long period in the upper receptacles the valves are opened and the grain and the softening liquid are run into the lower receptacles, the lower valve of which is opened to allow the softening liquid to escape from the receptacle whereupon it can be led away in any suitable manner, for instance, by means of outflow pipes provided for this purpose. After the softening liquid has escaped, the lower valve is closed, the air pressure supply pipe is coupled to its connection and the swelling or germinating process starts. After this is complete the lower receptacles are rotated until they stand above the rocking hoppers, whereupon both the upper and the lower valves are opened and the grain is run into the rocking hopper.

In Figs. 3 and 4 II indicates the softening receptacle during the softening period; V the emptying of the upper receptacles after the softening is completed as well as the escape of the softening liquid from the lower receptacle; IV a receptacle for swelling or germinating while this process is in progress and I the flow of the grain into the rocking hopper after the completion of the swelling or germinating process. As the valves of the swelling or germinating receptacles are constructed similarly to those shown in Figs. 1 and 2 they have been simply indicated by lines in this instance. In I the receptacles are shown so far moved forward as to stand above the rocking hopper.

It is obvious that the upper receptacles may also be furnished with a double valve, if desired. In this case the softening liquid can escape directly from these receptacles and the grain only is fed into the lower receptacles after the softening liquid has all been drawn off. If this arrangement is adopted the lower receptacles need be provided only with a valve of the ordinary kind, and may moreover be stationary. This construction, which is illustrated in Figs. 7 and 8, is especially suitable for use whenever the space available is insufficient for a quadrangular arrangement of the receptacles. In this modification it is necessary to arrange the outlet pipes for the softening liquid rotatably.

The alternate feeding of the separate receptacles is effected by means of any suitable feeding device.

It is advantageous that the grain, during its softening, should be at rest; during the swelling or germinating process it is, however necessary that the grain should be stirred up by means of air under pressure or in any other suitable manner to accelerate a continuous swelling or germinating and to prevent its caking together and to accelerate the process.

As already stated by means of the process to which this invention relates the peeling and degerminating of the grain is avoided and the main feature of the cleansing operation becomes the washing and drying process, which renders necessary a repeated and thorough washing of the grain. This is most advantageously effected by means of a centrifugal device such as is shown in Figs. 5 and 6. It consists of a stationary external casing t portions of which are pressed inward tangentially in the direction of rotation of the inner rotating ring mechanism u, the parts n of the slots m which are free on three sides being pressed inward as shown. This casing is constructed plain up to a certain height, for the purpose of bringing the grains into contact with the water for a considerable period for the purpose of effecting its more thorough washing. A high pressure nozzle w serves to bring the partially cleansed grain, which by means of the centrifugal device is driven upward, again in contact with fresh water, to clean it in accordance with the counter current principle and to remove the impurities separated by centrifugal action. The grain mixed with water enters the centrifugal device at o, ascends along the oblique angles v, and, after being cleansed, passes out at p.

What I claim is:

1. A process for treating grain low in proteids which consists in mixing with a quantity of washed, dried and cooled low grade grain, a sufficient quantity of like grain previously germinated to a slight extent, but not sufficiently far to form malt, and then brushing and polishing the same.

2. A process for treating a low grade of grain to produce a high grade of flour, which consists in mixing with a quantity of said grain after being washed, dried and cleaned a sufficient quantity of like grain incipiently germinated, but not sufficiently far to form malt.

3. A process for treating grain low in proteids to produce a high grade of flour, which consists in mixing with a quantity of said grain about one-half as much more of like grain incipiently germinated, but its germination stopped before reaching the stage to produce malt.

In witness whereof, I subscribe my signature, in presence of two witnesses.

JOHANN GEORG FERDINAND DOMBACH.

Witnesses:
W. A. MANICE,
W. G. AAKER.